United States Patent

[11] 3,597,833

| [72] | Inventors | Oscar C. Frederick;<br>Albert C. Young, both of Springfield, Pa. |
|---|---|---|
| [21] | Appl. No. | 854,913 |
| [22] | Filed | Sept. 3, 1969 |
| [45] | Patented | Aug. 10, 1971 |
| [73] | Assignee | General Electric Company |

[54] METHOD OF PERFORMING A BRAZING OPERATION ON TERMINAL STRUCTURE OF METAL BRAID
14 Claims, 4 Drawing Figs.

[52] U.S. Cl. ................................................. 29/479,
29/487, 29/494, 29/498, 339/275
[51] Int. Cl. .............................................. B23k 31/02
[50] Field of Search .......................................... 339/222,
275 R, 275 RB, 276 R, 276 RB; 29/487, 494, 498, 500, 479

[56] References Cited
UNITED STATES PATENTS

| 1,484,202 | 2/1924 | Baker | 339/275 |
| 1,731,218 | 10/1929 | Adams | 29/500 X |
| 2,288,348 | 6/1942 | Funk | 29/498 UX |
| 2,371,469 | 3/1945 | Rogoff | 339/222 UX |
| 2,449,373 | 9/1948 | Falge et al. | 339/275 X |
| 2,643,446 | 6/1953 | Matthysse et al. | 29/487 X |
| 2,972,657 | 2/1961 | Stemke | 339/275 X |
| 2,981,925 | 4/1961 | Kibbey et al. | 339/275 X |
| 3,061,923 | 11/1962 | Knapp et al. | 29/487 |

Primary Examiner—John F. Campbell
Assistant Examiner—Ronald J. Shore
Attorneys—J. Wesley Haubner, William Freedman, Frank L. Neuhauser, Oscar B. Waddell and Joseph B. Forman ABSTRACT: In this method, a tubular end ferrule is placed about the end of a short length of metal braid, and this assembly is placed in a chamber with the ferrule projecting through a hole in the chamber wall. A flow of nonoxidizing gas, such as nitrogen, is introduced into the chamber to form a blanket of nonoxidizing gas around the braid. While this blanket is present, heat is applied to the ferrule portion outside the chamber as part of a brazing operation that raises the temperature of the ferrule and the braid to a high level. After such heating, liquid nitrogen is introduced into the chamber to rapidly cool the braid and the ferrule.

Patented Aug. 10, 1971
3,597,833
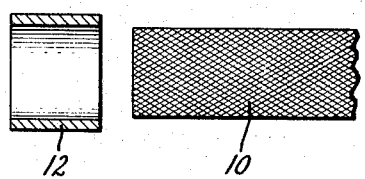
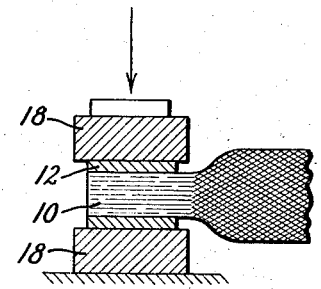
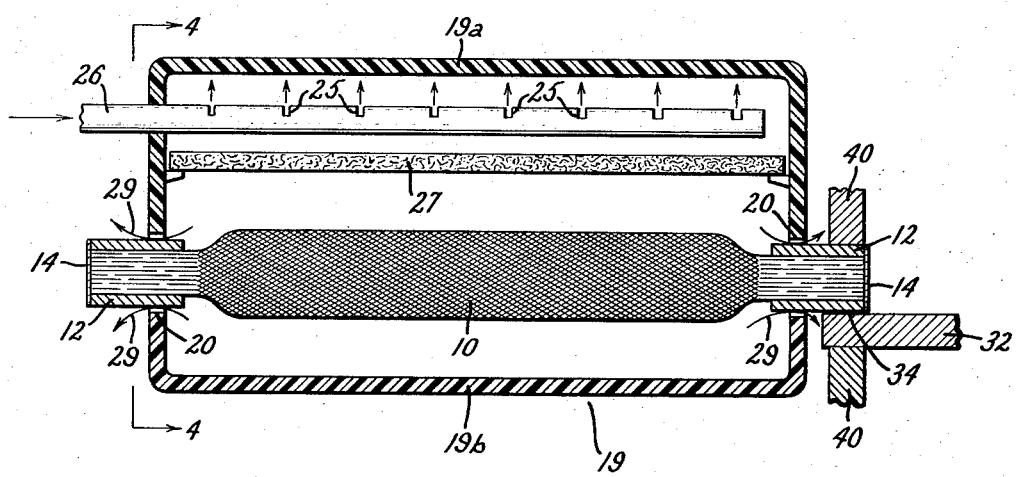
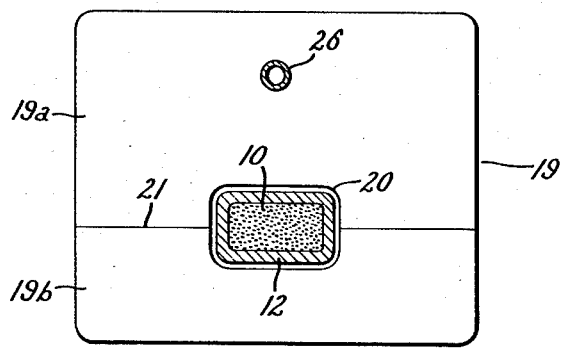
INVENTORS:
OSCAR C. FREDERICK,
ALBERT C. YOUNG,
BY William Freedman
ATTORNEY

METHOD OF PERFORMING A BRAZING OPERATION ON TERMINAL STRUCTURE OF METAL BRAID

This invention relates to a method of performing a brazing operation on terminal structure including an end ferrule at the end of a short length of metal braid and, more particularly, relates to a method of this type which can be quickly completed without permitting the braid surfaces to oxidize during exposure to the usual high temperatures accompanying brazing.

For carrying electric current between relatively movable parts, it is common to use conductive braid comprising many fine wires of copper twisted together to form a flexible conductor. This braid is usually provided with conductive end ferrules joined to the ends of the braid and serving as portions of terminal structures therefor. When large amounts of current are to be carried by the braid, brazed joints are typically used for joining the braid to its end ferrules. For making these brazed joints, it is necessary to rely upon a brazing operation that subjects the braid to high temperatures.

These high temperatures can cause the surfaces of the fine wires to oxidize, and this will embrittle the braid and increase the chance for a premature fatigue failure during subsequent use of the braid. It is especially important to avoid such embrittlement in those short lengths of braid which, in use, are subjected to large amounts of flexure per unit of length.

One way of avoiding such oxidation is to place all the parts in a chamber filled with a nonoxidizing gas and to perform the brazing operations in this chamber. This approach is disadvantageous because it requires an unduly large chamber and an unduly large amount of such gas and also because of the difficulties involved in handling the parts in such a chamber, particularly if several brazing operations are required to be performed within the chamber in order to complete the assembly. Still another problem in this approach is that cooling of the assembly to a safe temperature either consumes a long period of time or is awkward to perform.

An object of our invention is to provide a method for brazing such braid to end ferrules which protects the braid from oxidation, can be quickly performed using a relatively small amount of nonoxidizing gas, and can be relied upon to quickly cool the braid assembly.

Another object is to provide a method for brazing additional parts to the end ferrules of a braid assembly, which method protects the braid from oxidation, can be performed in air with only a relative small amount of nonoxidizing gas being used to protect the braid, and which can be relied upon to quickly cool the braid assembly.

In carrying out our invention in one form, we place a tubular end ferrule about the end of the braid and place the braid in a chamber with the end of the braid and the ferrule projecting through a hole in the chamber wall. We then introduce into the chamber a flow of nonoxidizing gas that displaces air from the region around the braid and forms a blanket of nonoxidizing gas thereabout. Heat is applied to the ferrule portion outside the chamber as part of a brazing operation that brings the temperature of the ferrule and the braid to a high level. After the heating part of the brazing operation has been completed, a low temperature fluid is introduced into the chamber to rapidly cool the braid and the ferrule. The fluid is a substance that has a boiling point below zero degrees C. and that in both the liquid and vapor stages is nonoxidizing with respect to the metal of the braid.

For a better understanding of the invention, reference may be had to the following description taken in conjunction with the accompanying drawing, wherein:

FIG. 1 is a view showing parts used in practicing our invention.

FIG. 2 shows a step used in the performance of one form of our invention.

FIG. 3 shows an additional step used in performing our invention in one form.

FIG. 4 is a sectional view taken along the line 4—4 of FIG. 3.

Referring now to FIG. 1, there is shown a length of braid 10 to each end of which it is desired to join by brazing a tubular end ferrule 12. The braid 10 is composed of many hundreds of fine copper wires twisted together in a conventional manner. The end ferrule is also of copper but has all of its surfaces silver plated. In one form of the invention, the braid and ferrule initially have a circular cross section.

The tubular ferrule 12 is first slipped over the end portion of the braid so that the extreme ends of the wire are flush with the outer end of the ferrule. Then, as shown in FIG. 2, the ferrule 12 with the braid in position is placed in a press 18; and the press is operated to deform the ferrule and the ferrule-enclosed portion of the braid into a form of noncircular cross section. This deformation forces the ferrule to tightly grip the end portion of the braid about its entire periphery and at the same time forces almost all of the air out of the ferrule. Another ferrule is applied to the opposite end of the braid in this same manner, after which the resulting assembly is placed in the chamber 19 shown in FIG. 3.

The chamber 19 of FIG. 3 has aligned holes 20 in its opposite sidewalls that loosely receive the end ferrules 12. Preferably, the chamber 19 comprises separable upper and lower portions 19a and 19b clamped together along a horizontal parting line 21 extending through the holes 19, as best seen in FIG. 4. These upper and lower portions 19a and 19b are separated to permit placement of the braid assembly in the position of FIGS. 3 and 4, after which the portions 19a and 19b are suitably clamped together as shown in FIGS. 3 and 4.

Ferrules 12 project through the aligned holes 20, and thus the entire exposed portion of the braid between the ferrules is located inside the chamber 19. All the air then present in the chamber 19 is then displaced from the chamber by introducing a nonoxidizing gas, such as nitrogen, through inlet ports 25 in a lead-in pipe 26 located near the top of the chamber. The nitrogen exhausts in an upward direction from the inlet ports 25 and then passes downwardly through a porous diffuser 27, which is made of fine-mesh screening or metal wool. This diffuser, by making the nitrogen flow more laminar, acts to minimize mixing of the nitrogen and the air initially present in the chamber 19. The displaced air is forced out of chamber 19 through the holes 20 via paths indicated by arrows 29; and after a short period of such flow, only nitrogen is present in the chamber. Some nitrogen also leaves the chamber 19 through holes 20, but this effluent is continuously replaced with fresh nitrogen entering through inlet ports 25. Once the air is completely displaced in this manner, the braid 10 is, in effect, enveloped by a blanket of nitrogen.

The next step in the joining operation is to apply heat to the portion of each ferrule which is located outside the chamber 19. This can be done in any suitable convenient manner, e.g., by a torch or by a resistance brazing machine, which presses its hot carbon electrodes against diametrically opposite sides of the ferrule. When the ferrule and the end of braid have been heated to a sufficiently high temperature, a thin layer 14 of brazing metal is suitably applied to the outer end of the assembly, whereupon the brazing metal melts and wets the end surface of the assembly. Upon subsequent cooling, soon to be described, the thin layer of brazing material solidifies and forms a good electroconductive joint between the extreme ends of the wires and the extreme end of the surrounding ferrule 12.

The above-described heating raises the temperature of the ferrules to a value exceeding 1,000° F. Since the braid 10 is of a highly conductive material, such as copper, heat is rapidly conducted along its length and its temperature rises to a high value in this general range even at its midsection. Despite this high temperature, however, no oxidation of the copper wires of the braid takes place because there is then no oxygen in contact with these wires, the oxygen having been displaced by the nitrogen blanket then enveloping the braid.

After the brazing metal has been melted as above described, liquid nitrogen at a temperature of about −320° F. is introduced into the chamber via openings 25. This liquid nitrogen quickly cools the portion of the braid 10 within the chamber 19; and this quickly extracts heat from the end portions of the braid and from the end ferrules via the copper braid, thus rapidly cooling the ferrules and the end portions. This cooling action causes the molten brazing metal to solidify, thereby completing the brazed joint. When the whole assembly has been cooled in this manner, it is removed from the chamber and is ready for use. Much of the liquid nitrogen vaporizes immediately after entering the hot chamber 19, and practically all has vaporized when the chamber is opened to remove the braid.

In certain applications, it may be desirable to braze structure in addition to braid 10 to the end ferrules. For example, referring to FIG. 3, a conductor 32 is shown brazed at 34 to the right hand end ferrule. The brazing operation relied upon to form this joint at 34 is a resistance brazing operation performed while the braid 10 is in the chamber 19 enveloped in the aforementioned gaseous nitrogen blanket. Even though this brazing operation heats the braid along its length, the braid is protected from oxidation during this time by the surrounding nitrogen blanket in the same way as it was protected during the other heating step described hereinabove. After these brazing operations, cooling is performed with liquid nitrogen supplied to the chamber 19 in the manner described hereinabove. This cooling operation rapidly cools the brazed joint 34 and the part 32 by extracting heat therefrom through the highly conductive braid 10.

This resistance brazing operation is performed by pressing the heated electrodes 40 of a resistance brazing machine against the parts 12 and 32, as shown in FIG. 3. Resistance brazing is a simple and quick operation, the use of which is greatly facilitated in our process because the parts 12 and 32 are outside the chamber 19 and are thus easily accessible to receive the electrodes 40. Had the assembly been located entirely inside a chamber containing a nonoxidizing atmosphere, it would have been much more difficult, expensive, and time-consuming to perform the brazing operation.

In a preferred embodiment of the invention, we introduce the liquid nitrogen into chamber 19 while the gaseous nitrogen is still flowing into the chamber 19, and this overlap substantially eliminates any chance for air leaking into the chamber during the changeover from gaseous to liquid nitrogen. After the liquid flow has continued for a short time, the gas flow is terminated. By using a very low temperature fluid, preferably a liquid, for cooling purposes, we can complete the cooling operation very rapidly, thus further reducing the chance for air leaking into the chamber while the braid assembly is still hot. By completing the cooling action quickly, we can also reduce the period of time that the chamber 19 must remain tied-up in a given brazing operation, thus making it available much sooner for performing additional brazing operations.

Although liquid nitrogen is preferred as a coolant, other types of fluid coolants can be used providing they and their vaporization products are nonoxidizing with respect to the material of the braid, which in this case is copper. To assure the desired rapid cooling action which minimizes the chance for air leakage into the chamber 19, we use a liquid that has a boiling point below zero degrees C and introduce it into the chamber at a temperature below 0° C.

While we have shown and described a particular embodiment of our invention, it will be obvious to those skilled in the art that various changes and modifications may be made without departing from our invention in its broader aspects, and we, therefore, intend herein to cover all such changes and modifications as fall within the true spirit and scope of our invention.

What we claim as new and desire to secure by Letters Patent of the United States is:

1. A method of joining a length of highly-conductive metal braid to a tubular metal end ferrule comprising:
   a. placing the tubular end ferrule about the end of said braid,
   b. placing the braid in a chamber with the end of the braid and the ferrule projecting through a hole in the chamber wall into a space located outside the chamber,
   c. filling said chamber with a gas that is nonoxidizing with respect to the material of said braid to displace air from the region around said braid and form a blanket of nonoxidizing gas about the portion of the braid within said chamber,
   d. applying heat to the portion of the ferrule outside the chamber to bring the ferrule and the end portion of the braid to a high temperature,
   e. applying brazing metal to the end of the braid and the end ferrule and utilizing the high temperature of said end ferrule and braid to melt said brazing metal so that said brazing metal upon cooling can form a brazed joint between said ferrule and braid,
   f. then introducing into said chamber a low temperature fluid that envelopes said braid and rapidly cools said braid, said ferrule, and said brazing metal,
   g. said fluid entering said chamber at a temperature below 0° C. and being a substance that has a boiling point below 0° C. and that in both the liquid and vapor state is nonoxidizing with respect to the metal of said braid, and
   h. maintaining said blanket of nonoxidizing gas around said portion of the braid within said chamber during said application of heat and until said low temperature coolant is introduced.

2. A method of making a brazed joint in terminal structure at the end of highly-conductive metal braid comprising:
   a. attaching a portion of said terminal structure to said braid,
   b. placing the braid in a chamber with the end of said braid and part of said attached terminal structure portion projecting through a hole in the chamber wall into a space outside the chamber,
   c. filling said chamber with a gas that is nonoxidizing with respect to the material of said braid to displace air from the region around said braid and form a blanket of nonoxidizing gas about the portion of said braid within said chamber,
   d. applying brazing metal and heat to the portion of said terminal structure outside said chamber to cause said terminal structure portion and said brazing metal to reach a high temperature that melts said brazing metal,
   e. said blanket of nonoxidizing gas being maintained about said braid inside said chamber while said heat is applied to said terminal structure portion,
   f. then introducing into said chamber a low temperature fluid that envelopes said braid and rapidly cools said braid, said terminal structure, and said brazing metal,
   g. said fluid entering said chamber at a temperature below 0° C. and being a substance that has a boiling point below 0° C. and that in both the liquid and vapor states is nonoxidizing with respect to the metal of said braid.

3. The method of claim 1 in which said ferrule is deformed following positioning thereof about the end of said braid so as to form an assembly of noncircular cross section in which said ferrule tightly grips the braid.

4. The method of claim 1 in which said nonoxidizing gas is nitrogen and said fluid coolant is liquid nitrogen when introduced into said chamber.

5. The method of claim 1 in which said fluid coolant is liquid nitrogen when introduced into said chamber.

6. The method of claim 1 in which said fluid coolant is a liquid when introduced into said chamber.

7. The method of claim 1 in which an additional metal part is brazed to the portion of said end ferrule outside said chamber, the brazing of said additional part to said ferrule being performed by
   a. placing brazing metal between said ferrule and said additional metal part,
   b. heating said ferrule, said additional part, and said interposed brazing metal by applying heat thereto outside said chamber while said braid inside said chamber is blanketed by said nonoxidizing gas, and c. utilizing said low temperature fluid introduced into said chamber for cooling said additional metal part.

8. The method of claim 1 in which said nonoxidizing gas, after being introduced into said chamber, is forced to flow through a porous structure before reaching the immediate vicinity of said braid, thereby facilitating displacement of air from the immediate vicinity of said braid.

9. The method of claim 1 in which said low temperature fluid coolant is caused to begin flowing into said chamber while said nonoxidizing gas is still being introduced into said chamber, thereby reducing the chance for air leakage into said chamber during this period.

10. The method of claim 2 in which nonoxidizing gas is nitrogen and said fluid coolant is liquid nitrogen when introduced into said chamber.

11. The method of claim 2 in which said fluid coolant is liquid nitrogen when introduced into said chamber.

12. The method of claim 2 in which said fluid coolant is a liquid when introduced into said chamber.

13. The method of claim 2 in which said nonoxidizing gas, after being introduced into said chamber, is forced to flow through a porous structure before reaching the immediate vicinity of said braid, thereby facilitating displacement of air from the immediate vicinity of said braid.

14. The method of claim 2 in which said low temperature fluid coolant is caused to begin flowing into said chamber while said nonoxidizing gas is still being introduced into said chamber, thereby reducing the chance for air leakage into said chamber during this period.